(12) United States Patent
Orsini et al.

(10) Patent No.: US 10,643,288 B2
(45) Date of Patent: May 5, 2020

(54) USE OF BLOCKCHAIN BASED DISTRIBUTED CONSENSUS CONTROL

(71) Applicant: TransActive Grid Inc., Brooklyn, NY (US)

(72) Inventors: Lawrence Orsini, Brooklyn, NY (US); Yun Wei, Brooklyn, NY (US); Joseph Lubin, Brooklyn, NY (US)

(73) Assignee: TransActive Grid Inc., San Francisco, CA (US)

( * ) Notice: Subject to any disclaimer, the term of this patent is extended or adjusted under 35 U.S.C. 154(b) by 368 days.

(21) Appl. No.: 15/292,783

(22) Filed: Oct. 13, 2016

(65) Prior Publication Data

US 2017/0103468 A1    Apr. 13, 2017

Related U.S. Application Data

(60) Provisional application No. 62/240,997, filed on Oct. 13, 2015.

(51) Int. Cl.
*G06Q 40/00* (2012.01)
*G06Q 40/04* (2012.01)
(Continued)

(52) U.S. Cl.
CPC ............ *G06Q 40/12* (2013.12); *G05B 15/02* (2013.01); *G06F 21/78* (2013.01); *G06Q 30/06* (2013.01); *G06Q 40/04* (2013.01); *G06Q 50/06* (2013.01); *G07F 15/003* (2013.01); *H04L 9/3239* (2013.01); *H04L 63/12* (2013.01); *G06Q 2220/00* (2013.01); *H04L 2209/38* (2013.01); *H04L 2209/56* (2013.01); *Y02B 10/30* (2013.01); *Y02P 90/90* (2015.11)

(58) Field of Classification Search
CPC ........ G06Q 20/06; G06Q 20/36; G06Q 40/02; G06Q 40/06; G06Q 30/06; G06Q 40/04; G06Q 30/02; G06Q 40/00; G06Q 40/00; G06N 3/00; G06N 5/04; H04L 29/08; H04L 67/1044
USPC ....... 705/64, 66, 69, 71, 39, 44, 68; 700/276
See application file for complete search history.

(56) References Cited

U.S. PATENT DOCUMENTS

2012/0310831 A1*  12/2012  Harris .................... G06Q 30/02
                                                                  705/44
2014/0303787 A1*  10/2014  Struckmeier ........... G06F 1/206
                                                                  700/276
(Continued)

OTHER PUBLICATIONS

Antonopoulos, A., "Mastering Bitcoin—Unlocking Digital Crypto-Currencies, Chapter 5: Transactions," *Beijing Cambridge Farnham Koln Sebastopol Tokyo*, Dec. 1, 2014, pp. 111-138 (XP055601416, ISBN: 978-1-4493-7404-4) (Retrieved from the Internet: https://unglueit-files.s3.amazonaws.com/ebf/05db7df4f31840f0a873d6ea14dcc28d.pdf. Retrieved on Jul. 2, 2019).
(Continued)

*Primary Examiner* — Olusegun Goyea
(74) *Attorney, Agent, or Firm* — Fish & Richardson P.C.

(57) ABSTRACT

A system for the cryptographically-secure, autonomous control of devices comprising, connected to or remotely operating devices in an electrically powered network and the transaction of the benefits, costs or value created by or transacted through the devices in this electrically powered network.

12 Claims, 7 Drawing Sheets

(51) Int. Cl.
    *G05B 15/02*      (2006.01)
    *G06F 21/78*      (2013.01)
    *H04L 9/32*       (2006.01)
    *H04L 29/06*      (2006.01)
    *G07F 15/00*      (2006.01)
    *G06Q 30/06*      (2012.01)
    *G06Q 50/06*      (2012.01)

(56) References Cited

U.S. PATENT DOCUMENTS

| | | | | |
|---|---|---|---|---|
| 2015/0206106 | A1* | 7/2015 | Yago | G06Q 20/0658 |
| | | | | 705/68 |
| 2015/0379510 | A1* | 12/2015 | Smith | G06Q 20/3829 |
| | | | | 705/71 |
| 2016/0092988 | A1* | 3/2016 | Letourneau | G06Q 40/06 |
| | | | | 705/66 |
| 2016/0140653 | A1* | 5/2016 | McKenzie | G06Q 40/02 |
| | | | | 705/69 |
| 2016/0162897 | A1† | 6/2016 | Feeney | |
| 2016/0203448 | A1* | 7/2016 | Metnick | H04L 9/3247 |
| | | | | 705/64 |
| 2016/0203522 | A1† | 7/2016 | Shiffert et al. | |
| 2016/0203572 | A1* | 7/2016 | McConaghy | G06Q 20/3829 |
| | | | | 705/58 |
| 2016/0224949 | A1* | 8/2016 | Thomas | G06Q 20/027 |
| 2016/0224977 | A1* | 8/2016 | Sabba | G06Q 20/385 |
| 2016/0260171 | A1* | 9/2016 | Ford | G06Q 40/04 |
| 2016/0261690 | A1* | 9/2016 | Ford | H04L 67/1044 |
| 2016/0323109 | A1* | 11/2016 | McCoy | G06Q 50/184 |
| 2016/0330034 | A1* | 11/2016 | Back | G06Q 20/06 |
| 2016/0335533 | A1* | 11/2016 | Davis | G06Q 40/08 |
| 2016/0342977 | A1* | 11/2016 | Lam | G06Q 20/02 |
| 2016/0344737 | A1* | 11/2016 | Anton | G06F 21/6227 |
| 2016/0358135 | A1* | 12/2016 | Liao | G06Q 20/10 |
| 2016/0358161 | A1* | 12/2016 | Cobban | G06Q 30/0201 |
| 2016/0358253 | A1* | 12/2016 | Liao | G06Q 40/04 |
| 2018/0165660 | A1 | 6/2018 | High et al. | |
| 2019/0080392 | A1* | 3/2019 | Youb | G06F 21/64 |

OTHER PUBLICATIONS

Kawasmi et al., "Bitcoin-Based Decentralized Carbon Emissions Trading Infrastructure Model," *System Engineering*, Sep. 28, 2014;18(2):115-130 (XP055242445, ISSN: 1098-1241, DOI: 10.1002/sys.21291).

Swan, M., "Chapter 2: Blockchain 2.0: Contracts," *O'Reilly Media, Incorporated*, Feb. 8, 2015, (XP055579600, ISBN: 978-1-4919-2049-7), pp. 9-26.

European Search Report for Application No. 16856180.1, dated Jul. 9, 2019, 11 pages.

International Search Report and Written Opinion for International Application No. PCT/US2016/056817, dated Jan. 10, 2017, 10 pages.

International Preliminary Report on Patentability for International Application No. PCT/US2016/056817, dated Apr. 26, 2018, 6 pages.

\* cited by examiner
† cited by third party

TRANSACTIVE GRID NETWORK

FIG. 2     TAG ELEMENTS: COMPONENTS AND FUNCTIONS; EXAMPLES OF ASSETS CONTROLLED

SMART GRID CONTACTS: COMPONENTS AND MECHANISM

SETTLEMENT METHOD

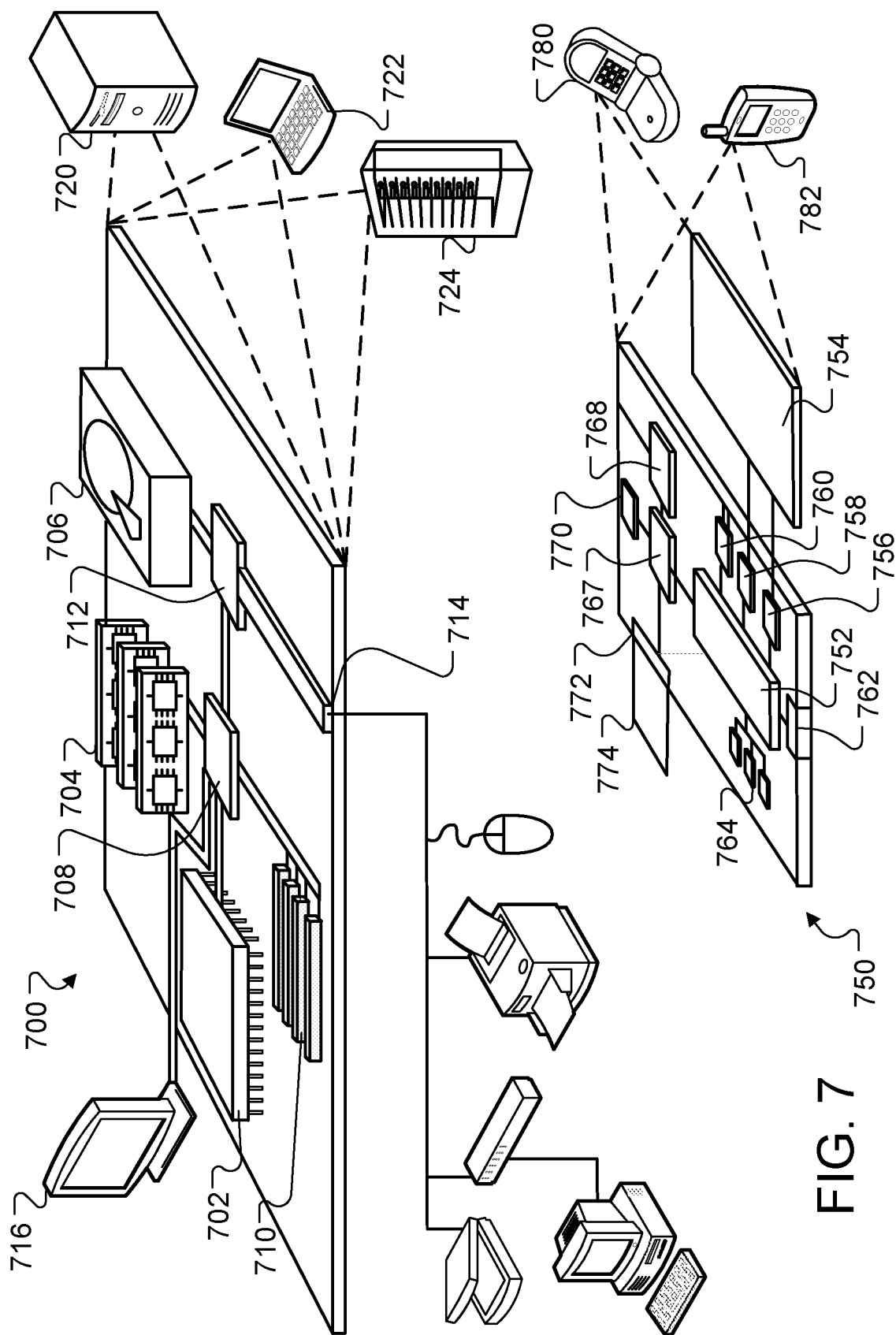

USE OF BLOCKCHAIN BASED DISTRIBUTED CONSENSUS CONTROL

CLAIM OF PRIORITY

This application claims benefit of priority under 35 USC § 119(e) to U.S. Patent Application Ser. No. 62/240,997, filed Oct. 13, 2015, the entire contents of which are hereby incorporated by reference.

TECHNICAL FIELD

The disclosure relates to the field of automated electrical power system and computation control systems, and more particularly, to systems, methods, and apparatus for distributed electric power system and computation system control. The disclosure relates to peer-to-peer settlement for participation in energy and computation supply and/or curtailment of supply, and for energy or computation capacity consumption or usage by elements in the distributed network.

BACKGROUND

Secure and automated control of distributed energy and computation systems is critical to the growth and function of the global economy. Current SCADA, IEC 61850, IEEE 1547 and various IP-based smart grid control systems are vulnerable to cyber security attacks, physical attacks or malicious operators within the network. The proliferation of consumer-owned energy smart grid technologies, distributed energy resources and powerful computation systems present an opportunity for sharing-economy based, peer-to-peer control and payments for the production, curtailment, use or benefits of smart grid devices. The integration of these and other smart grid assets improve reliability, resiliency, flexibility, and efficiency of the electric delivery system and our economy.

Many of the recent advances in smart grid technology build on the foundation of two-way communication (sensing, metering, automation etc.) and computer processing. However, computation is mainly viewed and utilized as a means to execute and achieve these functions rather than a new class of distributed resources itself.

SUMMARY

The TransActive Grid (TAG) is a network, platform and system for control of TAG elements (TAGe). It is a market-based, peer-to-peer control, settlement and registry system for transactions within a decentralized, distributed, electric power grid network comprised of an integrated set of smart grid contracts and two or more TAGe.

In general, one innovative aspect of the subject matter described in this specification can be embodied in methods that include the act of receiving, by a self-executing contract, settlement information from at least two nodes in a network, the network comprising a plurality of nodes, each node comprising at least one physical component and at least one control component, wherein each node in the plurality of nodes is configured to transact autonomously with every other node in the plurality of nodes. The methods include the act of validating a current state of a public ledger. The methods include the act of generating fulfillment information based on the received settlement information. The method also includes the act of contributing to an updated state of the public ledger using the fulfillment information.

Particular embodiments of the subject matter described in this specification can be implemented to realize one or more of the following advantages. Using the same statement to validate data on a user interface and data stored in a database has the advantages of reducing the number of programs that need to be developed and maintained. The costs associated with developing, testing, and maintaining a computer program or application are thereby reduced.

The foregoing and other embodiments can each optionally include one or more of the following features, alone or in combination. The fulfillment information may identify an exchange of at least one of benefits, goods, and services, for value. Each node in the plurality of nodes may maintain at least a predetermined number of tokens, each token can represent a value, and an external node is excluded from the network based on a number of tokens maintained by the external node. Each node may be associated with a reputation value, the reputation value may be included in the settlement information. The fulfillment information may be based, at least in part, on a physical distance between nodes.

In general, another innovative aspect of the subject matter described in the specification includes a system for the cryptographically-secure, automatic or autonomous control of devices comprising, connected to or remotely operating devices in an electrically powered network and the transaction of the benefits, costs or value created by or transacted through the devices in this electrically powered network.

The system may include one or more of the following features. Devices comprising, connected to or remotely operating an electric electrically powered network may operate as a node in the network of devices which functions to cryptographically-secure the operation of the network. The use of autonomous, self-executing contracts may be hosted on the network may operate devices on the network while simultaneously transacting the benefits, costs or value created by the device's operation between nodes of the network. The results of autonomous, self-executing contracts may be recorded on an immutable, append-only, public ledger which maintains a database of all transactions that have taken place on the network. This database may be hosted on the distributed network of devices. This ledger and database may be autonomous and independent of control by any single node of the network. The network may ensure the cryptographically secure, decentralized, autonomous and independent function of the public ledger and self-executing contracts are maintained independent of the individual nodes that make up the network. Access to the network is provided for the creation or execution of autonomous, self-executing contracts which control the devices or transactions of claim. The many different benefits, costs or value created by the system or network may be combined to create a token that is representation of the many potential attributes of the benefits, costs or value transacted on the network. This token is a representation of any form of value that might be assigned by the participants of the network who may wish to transact the characteristics of the devices.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 7 illustrates an example of a computing device and a mobile computing device that can be used to implement the technique described herein.

DETAILED DESCRIPTION

Figure 1:
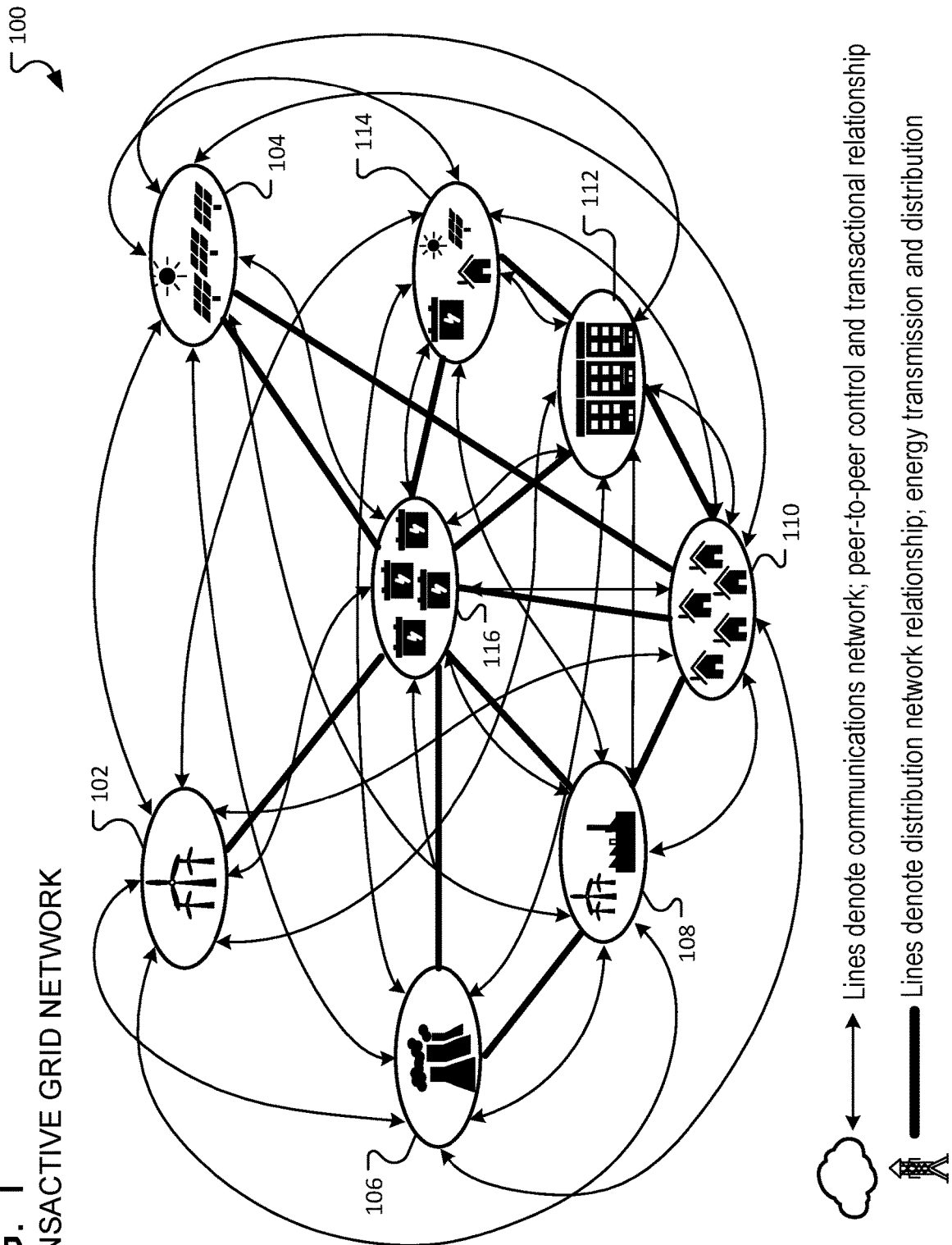
FIG. 1 illustrates an example of TransActive Grid network.

An autonomous, distributed, control system can be used for a utility grid. The control system is redundant, scalable, resilient, auditable, secure and possesses the ability to quantify and transact any type of value from one peer to another peer on a utility grid. The control system is made up of nodes (called TAG elements) which create a network (called a TAG network) and can operate automatically or autonomously in a secure fashion. In some implemetantations, the network uses an open-source, cryptographically-secure, decentralized application platform of control that is built on blockchain technology. In general, blockchain technology creates a secure ledger that includes a record of the events or transactions that occur on the network. A blockchain ledger can be recorded in the memory of devices that comprise the network. The blockchain ledger forms a distributed database which can ensure that transactions on the network are never double-counted and are transparent, auditable, and irrepudiable for the lifetime of the network.

The network platform can be turing-complete allowing for the creation and execution of distributed applications. These applications, which are hosted on the network, are independent of individual nodes of the network once they are created which provides for the security and autonomy of the applications. One form of distributed application is a Smart Grid Contract. Smart grid contracts can live and self execute on the network, and are independent of individual nodes of the network. Once created and deployed, the smart grid contracts will self execute exactly as intended because they are secured through the use of very strong cryptographic primitives inherent to the TAG network. This can allow for the unbreachable security of distributed applications whereby only a majority of the TAG elements that comprise the network can effect malicious action. In one embodiment, security is ensured through making a successful network attack cost prohibitive as the risk of an unsuccessful attack may cause exclusion from network participation. In this way, the distributed applications on the network can securely operate devices without the risk of interference from actors or forces outside the network. The network operates in a selfish and resilient fashion as any new node added to the network is compelled to work within the secure parameters of the network or be excluded from participation in the network. For example, an excluded node might be prevented from adding transaction information, processing or committing smart contract information to the blockchain.

Distributed applications operate devices which are connected to the network in a secure, autonomous and auditable manner. The TAG elements which comprise the network are physically embedded in, or securely connected to, devices that comprise or connect to a utility grid. TAG elements locate, uniquely identify, control, monitor, secure, validate and transact, in a peer-to-peer fashion, any value that a device on a utility grid can generate, consume, curtail, store or transport across a utility grid. The value that any device connected to a TAG element can quantify can then be traded in a peer-to-peer fashion through the use of a TAG token. A TAG token can embody any value that can be quantified for the purpose of transacting benefit across the network in a peer-to-peer fashion. Each TAG token can be uniquely identified on the network. A TAG token's history of creation and transaction is recorded on the blockchain and is fractionalized to include the representation of different types and quantities of value to be traded across the network.

For example, a photovoltaic panel creates a kilowatt of energy. The energy is measured and assigned a token value by a TAG element embedded in the photovoltaic system's inverter. The token value contains the quantity of energy generated, the portion of a REC (renewable energy certificate) created, the location, time, unique identifier of the TAG element, information about the photovoltaic system's construction, size, date of installation, owner, installer and system age and minimum number of TAG elements required to complete the transaction.

The TAG element uses this token information to create a self-executing, smart contract that is deployed to the TAG network. This smart contract may include requirements for the time, location, client type, sale price, environmental footprint, preferred organization type to transact (for-profit or non-profit, commercial, residential, etc.) and TAG network reputation value and the delivery cost of transporting the energy and other values represented in the token across the utility grid as a requirement of successfully transacting. This smart contract is released to the network and looks for one or more counterparties on the network which match its requirements to execute. In some implementations, the smart contract includes executable code which performs the operations associated with the smart contract, as described below.

The smart contract can find an ultimate buyer or peer to sell the value represented in the token as well as contracting with any number of network elements required to transfer the energy and other token values across the utility distribution network between the buying and selling peers. The elements required to transport the energy across the utility grid can have contracts that live on the network which set the terms for their use in transferring energy and other benefits across the utility network.

Once the counterparties are located and contract terms are settled, the transaction can be recorded to the blockchain ledger and value can be exchanged via the token between the TAG elements that have transacted. The owner(s) of the various TAG elements required to satisfy the smart contract can transfer this value across the TAG network between elements or strike a price and sell or barter the token on an exchange for money or any form of compensation agreed upon.

In this manner the full, localized cost of generation, transmission and distribution system can be represented and accounted for in real time across a utility grid. This also allows for localized, market-based, irrepudiable valuation of distributed energy resources, commodity and services in a utility grid.

The disclosure involves creating a distributed network of computing devices that can provide for the security and operation of smart grid assets and distributed energy resources in the network, and functions as a fungible distributed computing resource. The disclosure describes equipment and methods to utilize grid-connected appliances. Examples of consumer-owned smart grid assets include grid-connected and responsive smart appliances (such as smart water heaters), load control switches, thermostats and electric vehicles.

The disclosure describes equipment and methods that can optimize and control distribution-level generation and storage systems. Distributed energy generation and energy storage systems includes distributed energy resource like photovoltaic and wind systems and storage assets including electro-chemical, thermal, flywheel and other means of energy storage.

The disclosure describes equipment and methods to create building-level computation systems. Examples of distributed computation systems includes personal/professional computing devices and computation systems tied to building functions and operations such as building equipment controls (lighting, HVAC, etc.), management systems, and security systems. The proposed disclosure also describes equipment and methods to create a blockchain-based, distributed, consensus network of control. The proposed disclosure enables time-synchronized measures and increases interoperability in a secure manner.

FIG. 1 illustrates an example of TransActive Grid (TAG) network 100. A TAG network is a distributed computing network that includes one or more decentralized TransActive Grid elements (TAGe) that operate as nodes. TAG network can function as a consensus system that can generate, route and confirm transactions on a cryptographically-secured, shared public ledger (for example, a blockchain ledger). TAGe can process and validate transactions, computations and data transferred on the network to achieve consensus on changes in the network. Generating consensus between the various TAGe on the TAG network can provide security. Increasing the number of TAGe on the network increases the certainty that shared consensus on the network is a canonical and irrepudiable representation of network state. A blockchain is a distributed database that maintains a continuously growing list of data records. The blockchain can be configured such that the list of data records cannot be altered even by operators of the network's nodes. The blockchain is used to cryptographically secure information transferred between the TAGe that comprise the TAG. For example, The TAG network 100 can be made up of TAGe connected to various physical computational devices. These devices can include, for example, energy produces such as wind turbines 102, solar photovoltaic systems 104, nuclear power plants 106. The devices can also include energy consumers such as, smart home and building control systems 112 and residential areas 110. The devices can also be associated with nodes that are both energy producers and consumers, such as, a farm 114 that includes a solar photovoltaic systems and a residence, and a wind turbines that provides power to a factory 108. Each of these devices may obtain energy from or provide energy to an energy storage facility 116. TAGE can also include combined heat and computation systems, utility meters, smart invertors, and battery storage systems 116.

Figure 2:
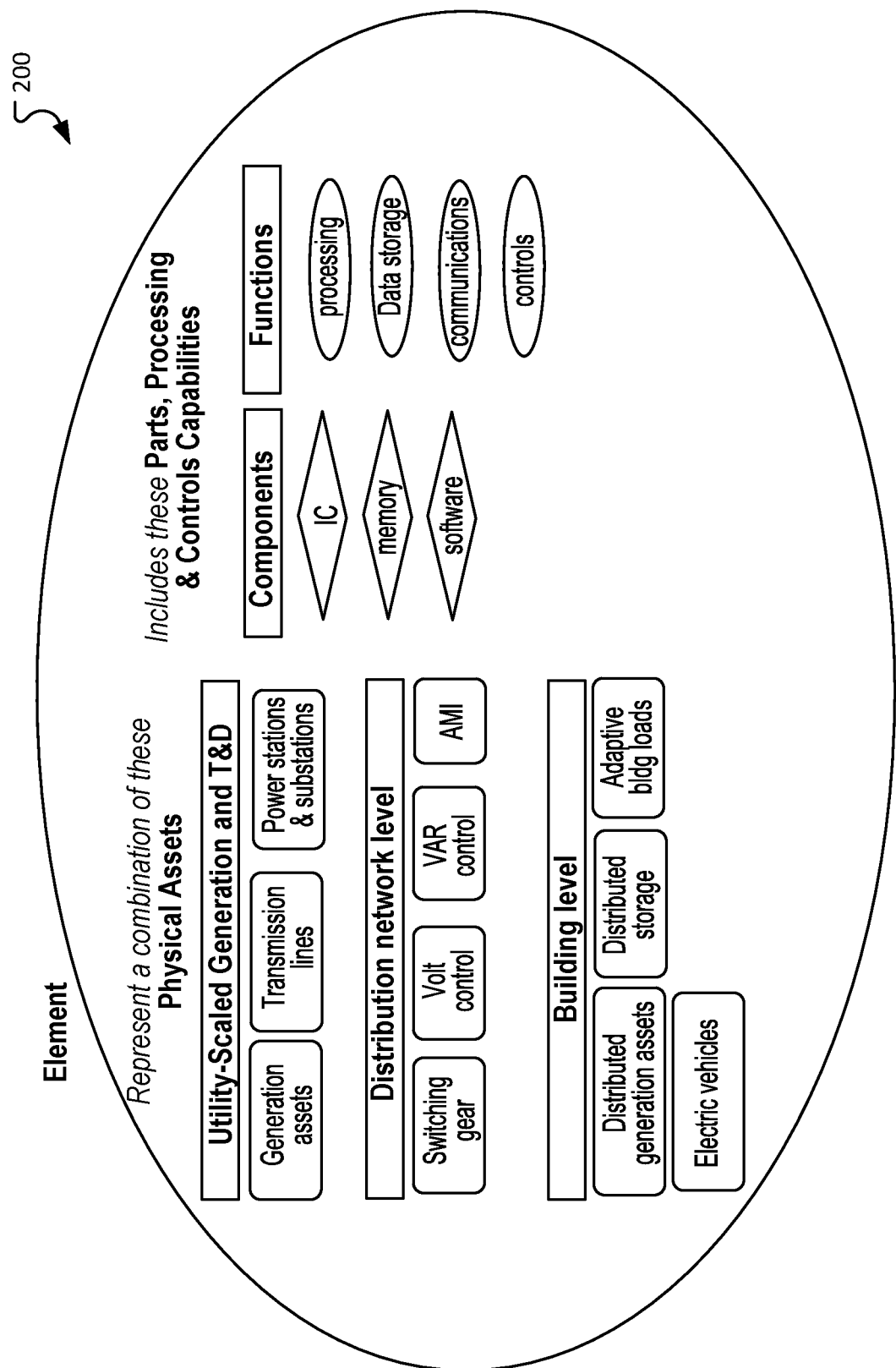
FIG. 2 illustrates an example of components and functions of TAG elements, devices, components, and their primary functions and relationships to one another.

FIG. 2 illustrates an example of components and functions 200 of a TAGe. TAGe can be used to cryptographically secure, control or transfer data on the TAG network. TAGe can include any form of computing device or integrated circuit embedded in, retrofit to, or communicating in any fashion with, a device that monitors, produces, consumes, transfers, measures or stores energy, computation or data. TAGe allows for the secure, distributed, control of equipment comprising a utility or virtual utility grid whose communication protocols and methods may include but are not limited to SCADA, IEC 61850, IEEE 1547, wireless and various IP based smart grid control systems.

Devices and users comprising the TAG network can be assigned a unique identifier that can identify them on the TAG network.

Figure 3:
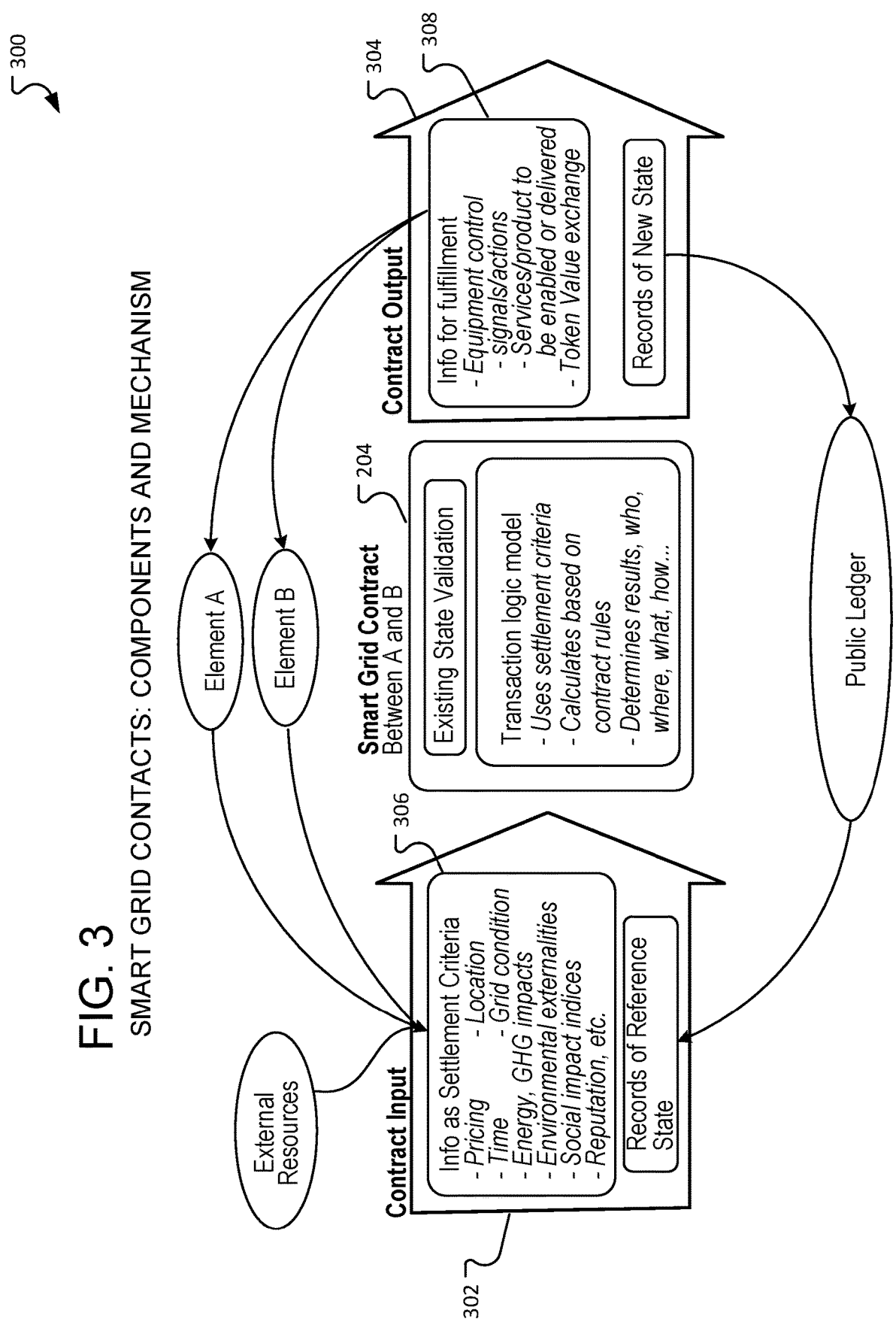
FIG. 3 illustrates an example of components of Smart Grid Contracts (including potential inputs, outputs).

FIG. 3 illustrates an example 300 of components of Smart Grid Contracts (including potential inputs 302, outputs 304). A set of Smart grid contracts can be self-sufficient, self-executing, cryptographically-secured computer software objects. Smart grid contracts can implement a transaction protocol designed to create and satisfy contractual conditions and securely operate assets in a power grid. Further, Smart grid contracts can exist on the TAG network and can be invoked via interaction with TAGe devices or via reception of data generated by TAGe devices. This data can be transferred in cryptographically secured data payloads carried on the TAG network.

The TAGe has the ability to relay encrypted data transactions to and from a data payload generator. A data payload generator is any device used to add information to or read information from a cryptographically secured data payload. Encrypted data transactions are carried on the peer-to-peer TAG network and stored non-repudiably in the blockchain. TAGe can relay revenue-grade metrology, system status, control commands, conditions or any form of data generated by or transmitted to TAG-connected devices that consume, provide, measure or curtail power or computation from a TAG-connected device. Contract inputs 302 may include pricing, location, time, grid conditions, energy GHG impacts, Environmental externalities, Social Impact indices, reputation, temperature, network information or other variables that contribute to the localization and valuation of energy, demand, information or control of devices physically, wirelessly, or otherwise connected to the TAG. Contract outputs 304 may include information for fulfillment 308 such as equipment control signals/actions, services/products to be enabled or delivered, and token value exchange.

The TAGe can receive and transmit a rich and secure stream of data to inform, control or transact the benefits of a wide array of services or devices. Examples of the devices are energy generation, storage, transmission and distribution assets, appliances, building management systems, security systems, computer and data systems, HVAC systems and other electronic or electromechanical devices (anything that uses real-time or near-term data for control). Some examples of energy services are energy curtailment, ancillary services such as load regulation, spinning reserve, non-spinning reserve, replacement reserve and voltage support. Some examples of cloud services are; distributed computing or acquisition, storage and transmission of data.

Figure 4:
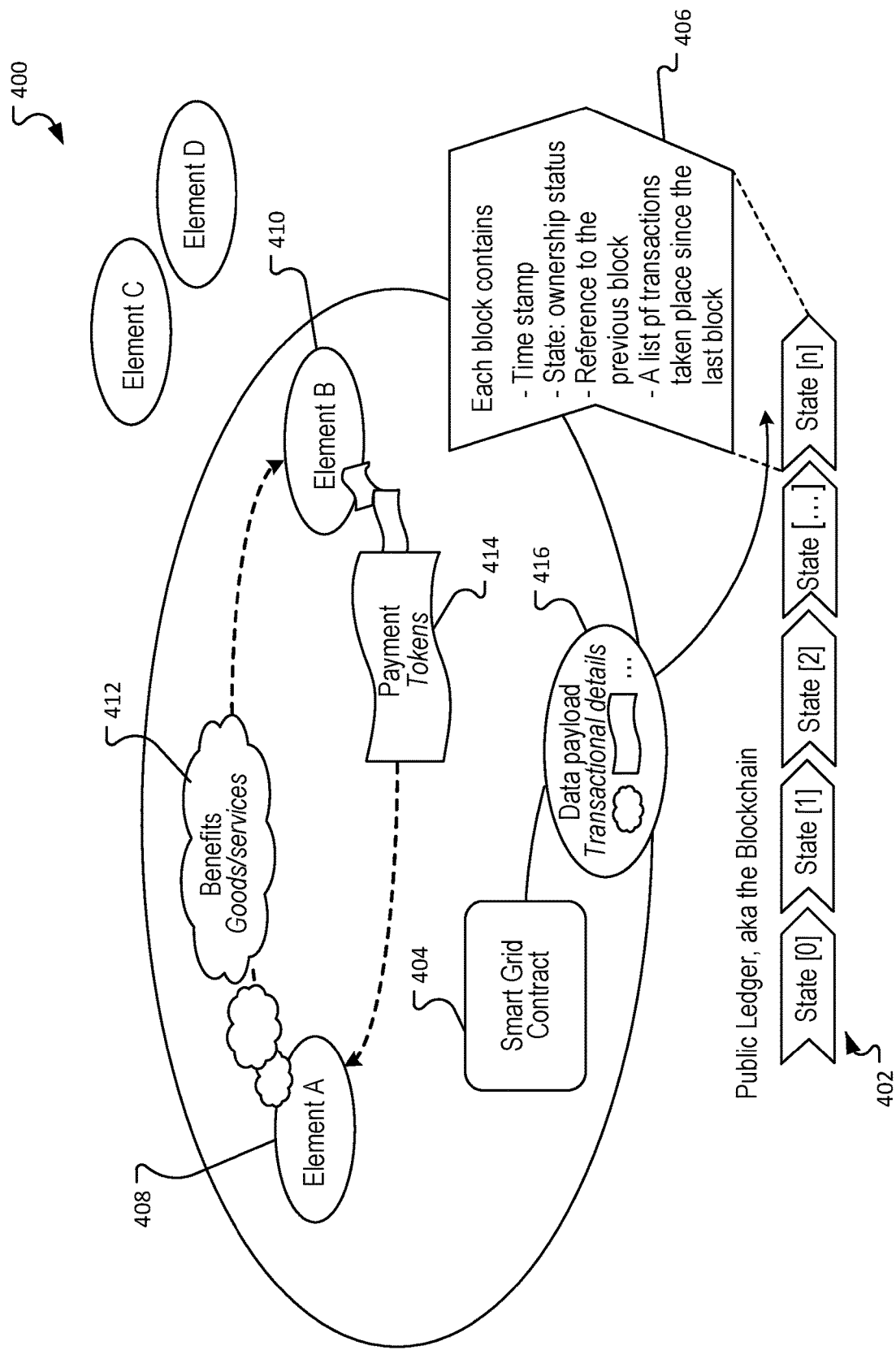
FIG. 4 illustrates an example of TAG settlement method.

TAGe Tokenization & Settlement: FIG. 4 illustrates an example 400 of TAG settlement method. In addition to grid-related data, the stream of encrypted data includes peer-to-peer financial settlement metrics for various forms of energy market, utility grid management, device control, distributed computing and data storage pricing. This data can be used for market-based financial settlement that can be based upon a TransActive Grid Token (TAGt). TAGt provides a quantifying market rate for the monetization of a unit of energy, energy-related environmental products, computation or data transferred or transacted between two or more TAGe nodes combined with any form of information contained in the data payload of the transaction.

TAGt may also incorporate data related to a wide range of localized and/or global environmental, social and economic impacts deriving from the production, consumption, transmission, distribution, load curtailment, TAGe or user reputation data, control and purchase of energy, computation, data transfer, and data storage. Such data can allow for the automated transaction and registry (also known as public ledger), maintenance of energy-related environmental products such as Renewable Energy Certificates ("RECs"), White Tags, Renewable Identification Numbers ("RINs"), Energy Savings Certificates ("ESCs"), White Certificates/Tradable White Certificates ("TWCs")/White Tags and Carbon Credits across TAG platform.

Due to the richness of the incorporated data, the transactions and registry adjustments could represent unique, identifiable impacts that could be auditable and hardened against double-counting or other accounting or record keeping errors or fraudulent manipulations.

Each TAGe device and user may have to maintain a certain minimum number of tokens as a requirement of participation on the network. These tokens can be associated with the device or user's unique ID and recorded as a representation of value in the shared public ledger of the blockchain. All transactions on the network may require tokens. Multiple classes of token may be used simultaneously to support different values, such as environmental, community and social externalities related to the transaction on TAG.

Reputation ranking platforms allow for quantification of a historic level of performance and other characteristics/attributes achieved by each TAGe or TAG user on the network. Reputation may be an important component of peer-to-peer transactions as it establishes a quantified legitimacy of any TAGe and facilitates the trust needed for entering smart grid contracts.

The reputation of individual TAGe devices or users can comprise factors including historic completion of transactions, ongoing equipment performance or failure of the TAGe to complete a Smart Grid contract. Reputation ranking of TAG users may aggregate the user's reputation capital across any number of existing reputation-based platforms such as Ebay, Angie's list, Google PageRank, etc. This existing, external, reputation capital may be combined with data included in a TAGt to quantify a TAG reputation value. This TAG reputation value may be used to assess transaction risk profiles of users and TAGe devices to allow for the rich and efficient quantification of transactional value and risk on the TAG.

The operation of the TAG may include network infrastructure and use costs incurred during the transaction of energy, computation or data across the electric power grid, internet, wireless, cellular or device to device networks. These costs may include service and replacement cost associated with individual grid components (that provide energy and data transmission and distribution, metrology, control commands, coordination, grid conditions), any form of computer, data system or other electronic or electromechanical devices required to support the function of the TAG.

TAGe transmission and distribution infrastructure may require a balance of TAGt in order to transact on the TAG. TAGe will generate or consume TAGt based on their function. Ultimately the distance between a load and a generation asset, as well as the number of TAGe required to transact between load and generation will localize the transaction cost across the TAG.

This embedded cost recovery mechanism ("transactional costs") is a tool to recognize system costs and improve reliability, resiliency, flexibility, and efficiency of the generation and delivery systems for energy, computation the internet and related economy. These costs are usually hidden because they are not easily quantifiable in existing cost and energy use accounting. The TAG will be devised to overcome a mix of technological and economic/policy framework barriers that can impede the development of needed generation, transmission and distribution infrastructure, build/upgrades and more.

A distributed network can include TransActive Grid elements (TAGe):
  a. each TAGe represents a collection of physical and/or controls components:
    i. these physical components may include assets and equipment on utility-scale generation and transmission level, distribution network level, and building generation and load level.
  b. each element can communicate and transact autonomously with one another.
  c. each element has IC, memory and software components so to perform functions including processing, data storage, communications and controls.

Smart grid contracts that utilize blockchain principles and facilitate transactions between various TAGe can enable resulting actions in a secure and time-synchronized manner with high interoperability.
  a. Blockchain, or Public Ledger, as employed by smart grid contracts, contains discrete "blocks" of information.
    i. essential information can include a timestamp, a State (or ownership status), reference to the previous block, and a list of transactions that took place since the last block.
  b. information posted on Public Ledger is visible and accessible to all
    i. Smart grid contracts are auditable, secure (for example, from cyber attacks) and ireputable (from gaming and tampering) because of the Public Ledger.
  c. smart grid contracts offer unified protocols that can increase interoperability between different physical and communication requirements used by TAG element's components.
  d. speed of smart grid contracts and speed of data processing and transmission can be similar. This affords precise time-synchronization for different grid applications.

An example of smart grid contract transactions can involve the following steps
  a. smart grid contract 404 request for and receive necessary settlement criteria from any number of elements involved (in this example, element A 408 and element B 410), public ledger 402 and any external resources.
  b. smart grid contracts validate Existing State (or Reference State) info from the Public Ledger 402.
  c. smart grid contracts perform or direct computation to determine whether and how a transaction shall be executed based on the settlement criteria received and logic model specified (by the entities who created or initiated the smart grid contract).
  d. smart grid contracts output fulfillment info that dictates whether and how services and products are to be enabled or delivered and how token values shall be exchanged.
  e. smart grid contracts send records 416 of/contributing to the New State 406 to the Public Ledger 402; these records may include elements/entities involved and the resulting states in benefits/goods/services 412 and values exchanged (for example, the payment tokens 414).

TOKENIZATION that allows representation of broad range of values:
 a. can be used to quantify, record and trade, in a streamlined and auditable way, a wide variety of benefits directly or indirectly associated with TAG Elements, such as environmental, social, locational, monetary, impacts and values in the network.
 b. allows for specialization of TAG Elements engaged in smart grid contracts by capturing their unique attribute profiles such as renewable energy certificates, credits, carbon credits, energy efficiency credits (white tags) and more
 c. enables owners of TAG elements to monetize and transact a diverse set of benefits of the TAG elements in a automated, auditable, streamlined and irrefutable fashion.

Smart grid contracts that exhibit these derivative functions
 a. requiring that transacting TAG elements to maintain a certain minimum number of tokens for participation; multiple classes of token may be simultaneously used to support different values.
 b. creating and deploying reputation ranking platforms based on historic level of performance and other characteristics/attributes achieved by the elements.
 c. use of the reputation value to further assess transactional risk profiles of users and elements as settlement criteria.
 d. recognizing and using the distance between a load and generation assets, approximated by the number of TAG elements required to transact to create locational pricings across the network and enables cost recovery.

Distributed network architecture ensures network stability, redundancy and resilience built into network.

A distributed computing network built using the distributed network architecture described above can run distributed applications, for example autonomous distributed building or device control systems, web services, secure peer to peer networking, distributed data management services, cloud storage, distributed databases, decentralized groups or companies, blockchain based distributed trading platforms, cryptographic tokens, document processing, blockchain based Turing complete virtual machines, graphics rendering, distributed blockchain based accounting systems, etc.

For example, the distributed computing network can run a heat recovery system. A heat recovery system recovers some of the energy is dissipated as heat. For example, data centers consume more than 2% of all electricity generated in the US. However, most of the electricity consumed by computation devices, both at data centers and on user site, is turned into heat that dissipates into the surroundings. Residential and commercial building energy use accounts for 40% of all energy uses in the US. Currently computers are designed to minimize heat production and optimize heat dissipation, and operate solely to satisfy computation needs.

Figure 5:
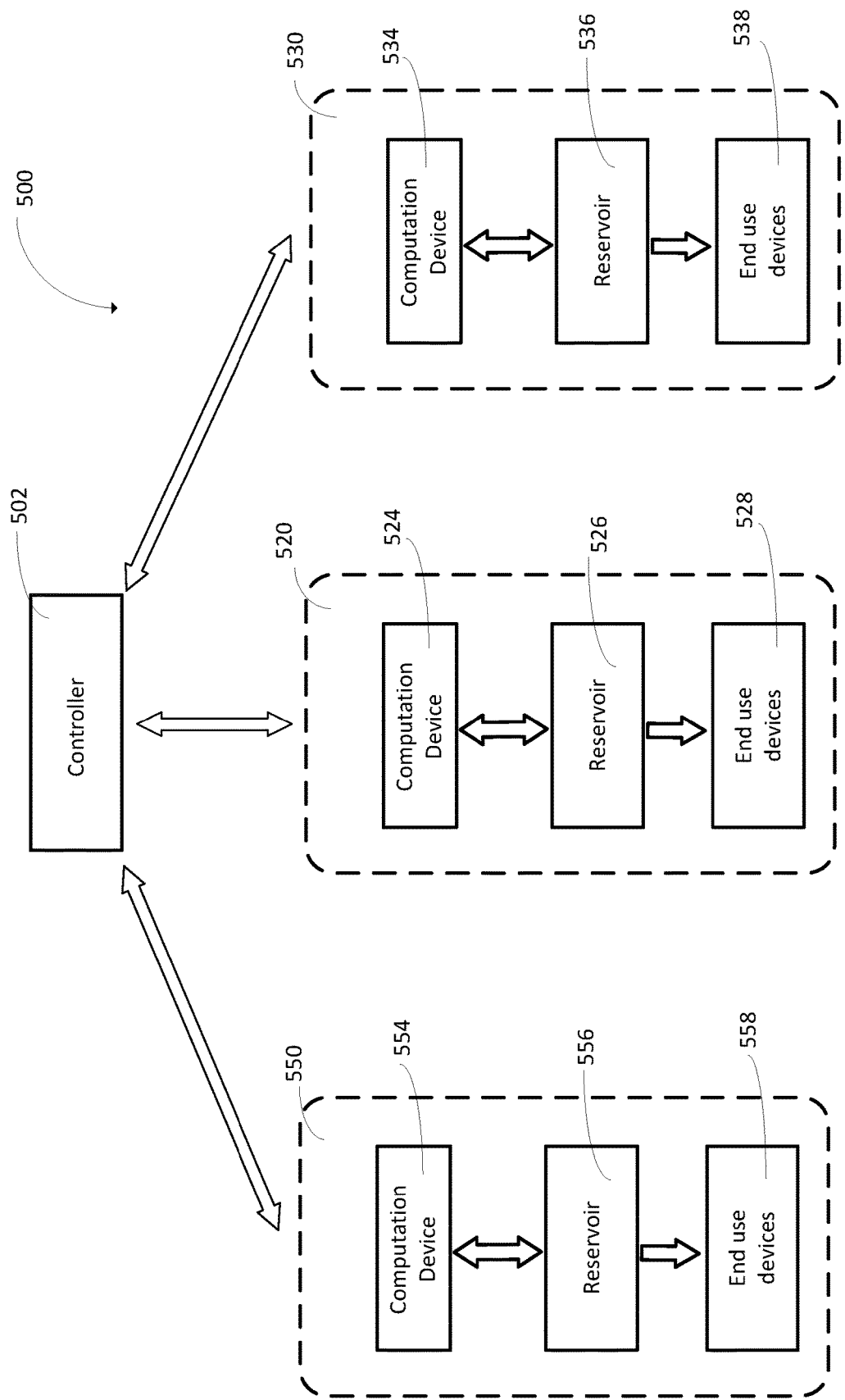
FIG. 5 illustrates a distributed heat recovery system that includes a controller that is configured to control the computation processes and heat recovery processes of multiple heat recovery sites.

FIG. 5 illustrates a distributed heat recovery system 500 that includes a controller 502 that is configured to control the computation processes and heat recovery processes of multiple heat recovery sites 510, 520 and 530. The controller 502 can provide instructions to, and receive signals from the heat recovery sites 510, 520 and 530. The controller and the computation devices of the heat recovery system 500 can also communicate with devices that are not a part of the system 500 through communication channels (for example, the internet) to form a distributed communication network.

Heat recovery site 510 includes a computation device 514 (e.g., computing device such as a computer system, etc.), a mechanism for extraction of heat energy generated by the computation device, heat reservoir 516 and end use devices 518 that use (e.g., are powered by) energy stored in reservoir 516. The controller device 502 is communicatively coupled to computation devices 514, 524 and 534 that are located at heat recovery sites 510, 520 and 530, respectively. The controller 502 assigns the computation devices with computing assignments or requests the computing devices to provide information related to computation or heat recovery processes. The controller 502 is also configured to receive triggering event signals based on which the computation and heat recovery processes can be modified. Trigger event signals relay trigger event signals to one or more controllers of the heat recovery system. The trigger event signals can originate from one or more sensing devices located in the heat recovery system or from devices outside the heat recovery system. The trigger event signals can comprise information related to an increase in current or anticipated energy demand by appliances that are powered by the recovered heat energy, an expected increase in electricity prices that powers the computation process, or computation assignment that needs to be executed.

Heat recovery sites, for example sites 510, 520 and 530, have a heat collection mechanism (not shown) that is used to transfer the heat generated by the computation devices to the reservoir 516. The reservoir 516 can comprise phase change material that can store heat energy. In other examples, the computation device, the heat collection mechanism and the reservoir can be integrated together. For example, the casing of the computation device may be filled with or constructed from phase change material that can efficiently store heat energy, or the hardware components of the computation device can be immersed in the working material of the heat reservoir. By storing thermal energy for future consumption, for example by end use devices 518, 528 and 538, the energy reservoir enables decoupling of processes associated with generation and consumption of heat energy. This results in the stabilization of temperature of the computing device.

The controller and the computation devices of the heat recovery system 500 can communicate with devices that are not a part of the system 500 through communication channels (for example, the internet) to form a blockchain based distributed communication network.

The controller can be programmed and configured to receive triggering event signals from heat recovery sites, devices located outside the heat recovery system or from autonomous distributed applications (applications that are run over the distributed computing network). Triggering event signals contain information about the existing and anticipated future computation and energy demands used to form a transaction based market for energy, computation or other services. Operation may include network infrastructure and use costs incurred during the transaction of energy, computation or data across the electric power grid, internet, wireless, cellular or device to device networks.

The computation device may operate as a node in the distributed computing network. For example, computation devices 514, 524 and 534 may operate as nodes on a distributed computing network that can confirm transactions between each other or with other devices on the network on a cryptographically-secured, public ledger called a blockchain. In addition to executing assigned workloads to generate heat, each computation device can execute local workloads (workload assigned locally at the heat recovery site of the computation device) and workloads assigned via distributed computation applications. The distributed computation applications may be turing complete which allows for their creation and operation on the distributed computing network that is independent of the individual nodes of the network. This provides for the autonomous, secure control of computing devices on the network.

The controller is capable of contracting, transacting, relaying and transmitting cryptographically secure workloads and commands to computation devices (for example, the computational devices 514, 524, 534), and dynamically re-determining computation workload assignment based on additional signals received and previous commands sent to computation devices which may be recorded on the blockchain ledger. The heat recovery system can also include a computer system which may act as a node in the decentralized network wherein the computation device is communicatively coupled with the controller, upon receiving signals from the controller carry out the workload assigned to generate heat via electricity input, is further contained in or coupled with an energy reservoir, where energy may be drawn to satisfy immediate energy demand and future energy demand from building end use systems.

The controller may be a, distributed application which is capable of autonomously receiving, contracting and transacting multiple variable triggering event signals from local site, offsite, and other distributed, decentralized applications, for present and anticipated future computation and energy demands on a blockchain ledger.

The computation workload assignment may also include cryptographic hash functions that can be used to secure, transact or host distributed applications in support of the distributed network controller can initiate the procedures of workload determination and transact some quantity of a token representing the value of Energy, computation, device control or services being exchanged as a result of the conditions being met, signaling a computing device to start computation. Multiple classes of token may be used simultaneously to support different values, such as environmental, community and social externalities related to the transaction. Triggering events could be demand for heat by the building end use systems, a lower than optimal temperature in the thermal energy reservoir, a predicted shortfall of heat based on predictive load management algorithms, grid responsive load management taking into account weather, grid conditions, energy or computation price signals or demand response to form a TransActive market for these services.

Triggering event signals can be based on demand for thermal energy or future demand events by the utility company that would require charging or precharging the energy reservoirs to offset the utility load or a change in the market value of the distributed computation in the future to create a distributed, cryptographically secure, blockchain based market for the transaction of these services Triggering event signals can also include information about favorable energy or computation pricing, anticipation of grid events, and alignment with and firming of renewable energy generation patterns by most effectively using their intermittent energy production allowing for the TransActive control of these devices in a self regulating, self balancing, blockchain based, secure and transparent market. The primary purpose of having triggering events signals is to allow the heat recovery system to be as flexible and adaptive as possible to environmental, economic, community, building, distributed computing network and operator needs.

instances when excess electrical energy is generated by an onsite rooftop photovoltaic (PV) system, the controller can dictate that the electric energy (DC or AC) should be used to power the computation device, transact the excess energy or computation on the distributed, blockchain based network and effectively store the generated heat energy in the thermal energy reservoir or sell it on a peer-to-peer or device-to-device TransActive platform.

Triggering event signals can also originate from outside the heat recovery system, and can contain data on pricing of electricity supplied by utility power grid, utility power grid conditions, weather conditions, etc. For example, the triggering events could be set as certain energy or demand pricing. When the price of electricity that supplies energy to the computation device is below a threshold (pre-set or determined based on certain method), the blockchain based controller will call and transact a suitable computation workload from the distributed computing network and prompt the computation device to perform computation. The thermal energy generated from the computation can be used during a later time when electricity price is higher.

In another triggering event scenario, the controller may command the computation device to dynamically start and terminate computation based on the goal of equalizing power generating and demand load profile that is recorded by the device on a blockchain and wirelessly communicated to other nodes on the network. For example, the triggering conditions may be data on the weather pattern and operation conditions of a large utility scale solar photovoltaic (PV) farm. When such a relatively large renewable "power plant" goes on/offline or changes the power output unavoidably due to insolation or other parameter changes, the controller can be configured to receive real-time weather and inverter data and determine the course of action accordingly based on economic transactions hosted on a blockchain based market for energy and device control that balance load and consumption of energy or computation.

The controller can determine a need for data storage, transmission or computation via the distributed computing network, and sends command to control the computation device to perform computations, store or recall stored data, or operate in as a market based, TransActive, peer to peer data transmission network so to act as redundancy support. The use of the combined heat recovery system can also be triggered by considerations on data transmission bandwidth, speed and prioritization. For example, the controller could receive signals from the distributed computation or energy network indicating a constraint in network bandwidth or system capacity between specific nodes, autonomously determine and settle transaction parameters to alleviate the constraint by optimizing communications, electricity generation and data or energy storage between nodes on the distributed network and initiate commands to perform data storage computation tasks between devices on the distributed computing network. The timing, content and size of the locally stored data may be motivated by ease, distance and frequency of use and further data transmission needs from the system.

A distributed local, TransActive platform which may be based on autonomus, selfexecuting, blockchain transactions on which developers can provide secure distributed applications to interact with a building's systems, appliances, distributed energy production and storage devices and inhabitants. These applications could automate and control the building systems as well as replace numerous consumer electronic devices such as computers, set top boxes, DVRs, alarm systems, or any device which uses microprocessors or data storage whose benefits could be provided by the appliance. The computation and heat recovery system can serve as a unifying platform for the connected smart home, automating and transacting the benefits of distributed computation, ancillary services, renewables firming, adaptive load control of smart appliances (such as grid responsive water heaters), thermostats, energy generation and electric car charging. The system is well suited for blockchain based peer to peer, internet of things and sharing economy services such as data storage, streaming video, audio, virtual computing and gaming services and other benefits to truly become an interactive and distributed resource of the self balancing, TransActive smart grid.

Each of such devices can contain one or more of computing device, and an entire system can be made up of multiple computing devices communicating with each other in a wired or wireless mesh network fashion.

By storing thermal energy for future consumption, for example by end use devices 518, 528 and 538, the energy reservoir enables decoupling of processes associated with generation and consumption of heat energy. This results in the stabilization of temperature of the computing device Design considerations, such as relative positioning, distances, order and configuration of the components of the computation device, can be optimized to enhance the effects of natural and forced convection, and facilitate the creation of a "thermal chimney" or stack effect. By optimizing the aforementioned design considerations, the flow of heat via the working material is streamlined. Further, the order in which the working material comes in contact or in proximity with computation components is optimized to maximize the temperature differences and heat exchange efficiency (surface area, configurations, distance between componentry, transfer mechanisms to increase exchange rate) between the working material and each hardware component of the computation device in its path. The components of the computation device are arranged such that the thermal energy collected by the heat exchange medium from the components contributes to the fluid buoyancy as it experiences temperature gain and carries the thermal energy to and through the reservoir. The design of the heat exchanger which extracts the thermal energy also contributes to the convective flow through the heat chimney as the heat transfer medium gains density as heat is extracted, reinforcing the convective effect through the thermal chimney.

The thermal storage system can include semiconductor based (LED) or other heat generating lighting system components. Lighting components generate significant heat which could be recovered by the system and used to power building thermal loads.

The space and other heating system comprises the occupant space heating system and systems for heating pools, hot tubs, saunas and systems for ice removal. The space and other cooling system can also include desiccant cooling system.

Figure 6:
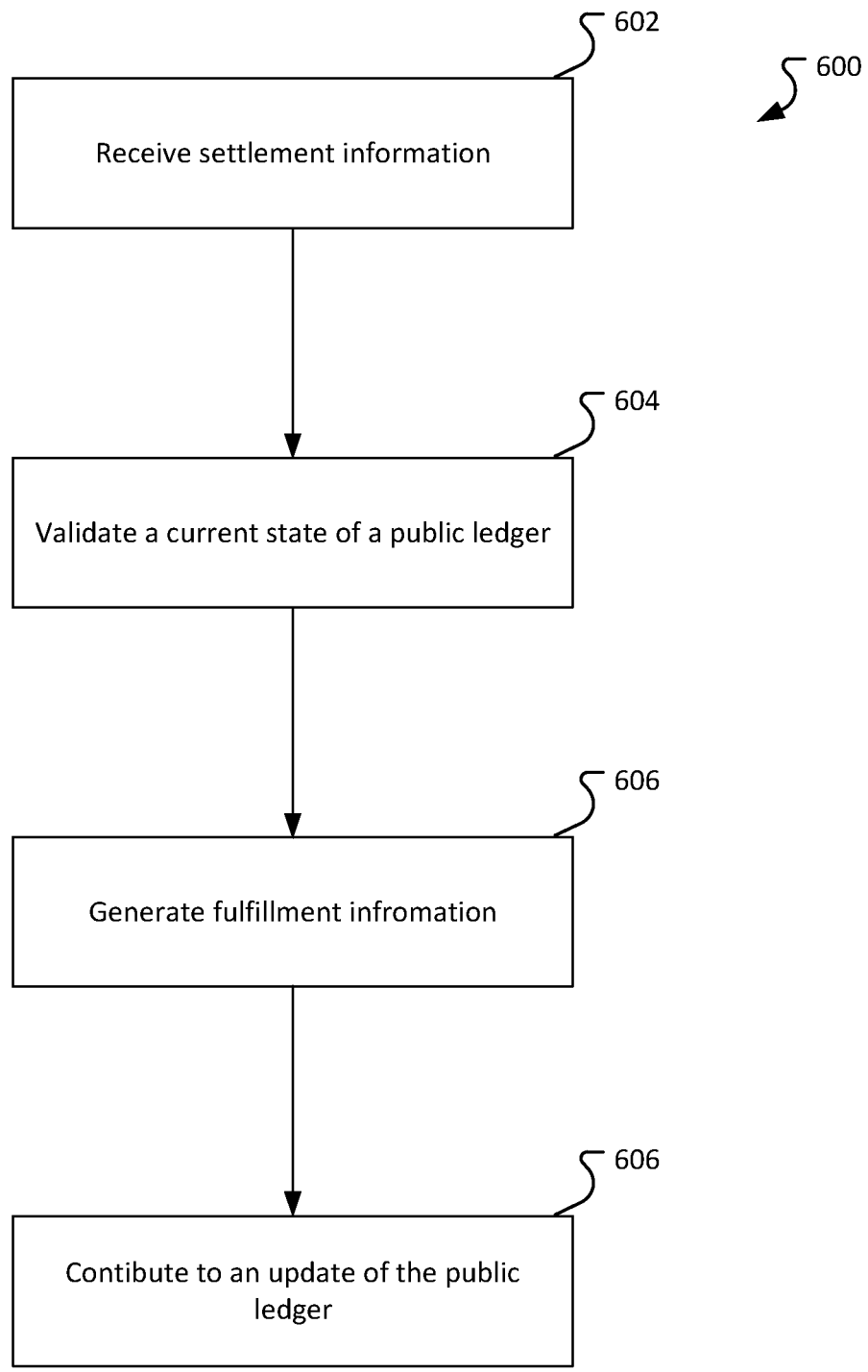
FIG. 6 is a flow chart for an example process for an executing a smart contract on a network.

FIG. 6 is a flow chart for an example process for an executing a smart contract on a network. The process 600 may be performed on a network. For example, the network may include multiple nodes, each node including at least one physical component and at least one control component (as described above). Each of the node in the network may be configured to transact autonomously with every other node in the network.

The process 600 receives 602 settlement information from at least two nodes in a network. The settlement information may include, for example, information about the goods, services, and value to be exchanged. In some scenarios, settlement information may be received from multiple different nodes. Contracts and exchanges are not limited to two nodes, for example, a combination of three of more nodes may participate in some contracts.

The process 600 validates 604 a current state of a public ledger; For example, the process 600 may validate the current state of a blockchain public ledger to verify that each settlement information received from each node is consistent with the information in the public ledger.

The process 600 generates 606 fulfillment information based on the received settlement information. For example, the settlement information may include information about a proposed/potential exchange. The process 600 may combine the information about the exchange, identify common ground within the received settlement information, and use the common ground to generate fulfillment information.

The process 600 contributes 608 to an updated state of the public ledger using the fulfillment information. The process 600 may update the public ledger to reflect the fulfillment information.

FIG. 7 shows an example of example computer device 700 and example mobile computer device 750, which can be used to implement the techniques described herein. For example, a portion or all of the operations described above may be executed by the computer device 700 and/or the mobile computer device 750. Computing device 700 is intended to represent various forms of digital computers, including, e.g., laptops, desktops, workstations, personal digital assistants, servers, blade servers, mainframes, and other appropriate computers. Computing device 750 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 700 includes processor 702, memory 704, storage device 706, high-speed interface 708 connecting to memory 704 and high-speed expansion ports 710, and low speed interface 712 connecting to low speed bus 714 and storage device 706. Each of components 702, 704, 706, 708, 710, and 712, are interconnected using various busses, and can be mounted on a common motherboard or in other manners as appropriate. Processor 702 can process instructions for execution within computing device 700, including instructions stored in memory 704 or on storage device 706 to display graphical data for a GUI on an external input/output device, including, e.g., display 716 coupled to high speed interface 708. In other implementations, multiple processors and/or multiple busses can be used, as appropriate, along with multiple memories and types of memory. Also, multiple computing devices 700 can be connected, with each device providing portions of the necessary operations (e.g., as a server bank, a group of blade servers, or a multi-processor system).

Memory 704 stores data within computing device 700. In one implementation, memory 704 is a volatile memory unit or units. In another implementation, memory 704 is a non-volatile memory unit or units. Memory 704 also can be another form of computer-readable medium (e.g., a magnetic or optical disk. Memory 704 may be non-transitory.)

Storage device 706 is capable of providing mass storage for computing device 1300. In one implementation, storage device 706 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 704, storage device 706, memory on processor 702, and the like.)

High-speed controller 708 manages bandwidth-intensive operations for computing device 1300, while low speed controller 712 manages lower bandwidth-intensive operations. Such allocation of functions is an example only. In one implementation, high-speed controller 1308 is coupled to memory 704, display 716 (e.g., through a graphics processor or accelerator), and to high-speed expansion ports 710, which can accept various expansion cards (not shown). In the implementation, low-speed controller 712 is coupled to storage device 706 and low-speed expansion port 714. The low-speed expansion port, which can include various communication ports (e.g., USB, Bluetooth®, Ethernet, wireless Ethernet), can be coupled to one or more input/output devices (e.g., a keyboard, a pointing device, a scanner, or a networking device including a switch or router, e.g., through a network adapter.)

Computing device 700 can be implemented in a number of different forms, as shown in the figure. For example, it can be implemented as standard server 720, or multiple times in a group of such servers. It also can be implemented as part of rack server system 724. In addition or as an alternative, it can be implemented in a personal computer (e.g., laptop computer 722.) In some examples, components from computing device 700 can be combined with other components in a mobile device (not shown), e.g., device 750. Each of such devices can contain one or more of computing device 700, 750, and an entire system can be made up of multiple computing devices 700, 750 communicating with each other.

Computing device 750 includes processor 752, memory 764, an input/output device (e.g., display 754, communication interface 766, and transceiver 768) among other components. Device 750 also can be provided with a storage device, (e.g., a microdrive or other device) to provide additional storage. Each of components 750, 752, 764, 754, 766, and 768, are interconnected using various buses, and several of the components can be mounted on a common motherboard or in other manners as appropriate.

Processor 752 can execute instructions within computing device 750, including instructions stored in memory 764. The processor can be implemented as a chipset of chips that include separate and multiple analog and digital processors. The processor can provide, for example, for coordination of the other components of device 750, e.g., control of user interfaces, applications run by device 750, and wireless communication by device 750.

Processor 752 can communicate with a user through control interface 758 and display interface 756 coupled to display 754. Display 754 can be, for example, a TFT LCD (Thin-Film-Transistor Liquid Crystal Display) or an OLED (Organic Light Emitting Diode) display, or other appropriate display technology. Display interface 756 can comprise appropriate circuitry for driving display 754 to present graphical and other data to a user. Control interface 758 can receive commands from a user and convert them for submission to processor 752. In addition, external interface 762 can communicate with processor 742, so as to enable near area communication of device 750 with other devices. External interface 762 can provide, for example, for wired communication in some implementations, or for wireless communication in other implementations, and multiple interfaces also can be used.

Memory 764 stores data within computing device 750. Memory 764 can be implemented as one or more of a computer-readable medium or media, a volatile memory unit or units, or a non-volatile memory unit or units. Expansion memory 774 also can be provided and connected to device 750 through expansion interface 772, which can include, for example, a SIMM (Single In Line Memory Module) card interface. Such expansion memory 774 can provide extra storage space for device 750, or also can store applications or other data for device 750. Specifically, expansion memory 774 can include instructions to carry out or supplement the processes described above, and can include secure data also. Thus, for example, expansion memory 774 can be provided as a security module for device 750, and can be programmed with instructions that permit secure use of device 750. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 764, expansion memory 774, and/or memory on processor 752), which can be received, for example, over transceiver 768 or external interface 762.

Device 750 can communicate wirelessly through communication interface 766, which can include digital signal processing circuitry where necessary. Communication interface 766 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 768. In addition, short-range communication can occur, e.g., using a Bluetooth®, WiFi, or other such transceiver (not shown). In addition, GPS (Global Positioning System) receiver module 770 can provide additional navigation- and location-related wireless data to device 750, which can be used as appropriate by applications running on device 750. Sensors and modules such as cameras, microphones, compasses, accelerators (for orientation sensing), etc. may be included in the device.

Device 750 also can communicate audibly using audio codec 760, which can receive spoken data from a user and convert it to usable digital data. Audio codec 760 can likewise generate audible sound for a user, (e.g., through a speaker in a handset of device 750.) Such sound can include sound from voice telephone calls, can include recorded sound (e.g., voice messages, music files, and the like) and also can include sound generated by applications operating on device 750.

Computing device 750 can be implemented in a number of different forms, as shown in the figure. For example, it can be implemented as cellular telephone 780. It also can be implemented as part of smartphone 782, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form of medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed:

1. A system comprising:
    a network comprising a plurality of nodes, each node comprising at least one physical component and at least one control component, wherein each node in the plurality of nodes is configured for token value generation, wherein each node in the plurality of nodes is configured to transact tokens autonomously with every other node in the plurality of nodes;
    wherein a node of the plurality of nodes generates a smart contract, the smart contract configured to:
        receive settlement information from at least two nodes in the network;
        validate a current state of a public ledger;
        generate fulfillment information based on the received settlement information and at least in part on a physical distance between nodes; and
        contribute to an updated state of the public ledger using the fulfillment information.

2. The system of claim 1, wherein the fulfillment information identifies an exchange of at least one of benefits, goods, and services, for value.

3. The system of claim 1, wherein each node in the plurality of nodes maintains at least a predetermined number of tokens, each token representing a value, and an external node is excluded from the network based on a number of tokens maintained by the external node.

4. The system of claim 1, wherein each node is associated with a reputation value, the reputation value being included in the settlement information.

5. A computer-implemented method comprising:
    receiving, by a self-executing contract, settlement information from at least two nodes in a network, the network comprising a plurality of nodes, each node comprising at least one physical component and at least one control component, wherein each node in the plurality of nodes is configured for token value generation, wherein each node in the plurality of nodes is configured to transact tokens autonomously with every other node in the plurality of nodes;
    validating a current state of a public ledger;
    generating fulfillment information based on the received settlement information and at least in part on a physical distance between nodes; and
    contributing to an updated state of the public ledger using the fulfillment information.

6. The computer-implemented method of claim 5, wherein the fulfillment information identifies an exchange of at least one of benefits, goods, and services, for value.

7. The computer-implemented method of claim 5, wherein each node in the plurality of nodes maintains at least a predetermined number of tokens, each token representing a value, and an external node is excluded from the network based on a number of tokens maintained by the external node.

8. The computer-implemented method of claim 5, wherein each node is associated with a reputation value, the reputation value being included in the settlement information.

9. A non-transitory computer storage medium encoded with computer program instructions that when executed by one or more computers cause the one or more computers to perform operations comprising:

receiving, by a self-executing contract, settlement information from at least two nodes in a network, the network comprising a plurality of nodes, each node comprising at least one physical component and at least one control component, wherein each node in the plurality of nodes is configured for token value generation, wherein each node in the plurality of nodes is configured to transact tokens autonomously with every other node in the plurality of nodes;

validating a current state of a public ledger;

generating fulfillment information based on the received settlement information and at least in part on a physical distance between nodes; and contributing to an updated state of the public ledger using the fulfillment information.

10. The non-transitory computer storage medium of claim 9, wherein the fulfillment information identifies an exchange of at least one of benefits, goods, and services, for value.

11. The non-transitory computer storage medium of claim 9, wherein each node in the plurality of nodes maintains at least a predetermined number of tokens, each token representing a value, and an external node is excluded from the network based on a number of tokens maintained by the external node.

12. The non-transitory computer storage medium of claim 9, wherein each node is associated with a reputation value, the reputation value being included in the settlement information.

* * * * *